United States Patent
Schenkel et al.

(10) Patent No.: US 6,636,021 B2
(45) Date of Patent: Oct. 21, 2003

(54) CIRCUITS AND TECHNIQUES FOR CAPACITOR CHARGING CIRCUITS

(76) Inventors: Jeffrey Schenkel, 3 Treetop Ct., Burlington, MA (US) 01803; Albert M. Wu, 103 Falkirk Ct., Apt. 1, Sunnyvale, CA (US) 94087; Robert C. Dobkin, 17350 Creekside Ct., Monte Sereno, CA (US) 95030; Steven M. Pietkiewicz, 45949 Hidden Valley Ter., Fremont, CA (US) 94539

( * ) Notice: Subject to any disclaimer, the term of this patent is extended or adjusted under 35 U.S.C. 154(b) by 0 days.

(21) Appl. No.: 10/324,628

(22) Filed: Dec. 18, 2002

(65) Prior Publication Data

US 2003/0090240 A1 May 15, 2003

Related U.S. Application Data

(63) Continuation of application No. 09/921,466, filed on Aug. 3, 2001.

(51) Int. Cl.[7] .................................................. H02J 7/14
(52) U.S. Cl. ....................................................... 320/166
(58) Field of Search ................................. 320/166, 139, 320/145, 141, 157, 158, 159; 323/234, 284, 288

(56) References Cited

U.S. PATENT DOCUMENTS

| 4,710,859 A | 12/1987 | Rilly ........................... 363/21 |
|---|---|---|
| 4,975,823 A | 12/1990 | Rilly et al. .................... 363/56 |
| 5,729,447 A | 3/1998 | Albach et al. ................. 363/56 |
| 6,127,810 A | * 10/2000 | Sato et al. .................... 320/148 |
| 6,137,265 A | * 10/2000 | Cummings et al. .......... 320/133 |
| 6,366,480 B2 | 4/2002 | Hosotani et al. .......... 363/21.14 |

OTHER PUBLICATIONS

Darren Gnanapragasam, Schematic of "Roadrunner–Strobe Board Revision A," *Motorola*, Mar. 28, 2001.

* cited by examiner

Primary Examiner—Gregory J. Toatley, Jr.

(57) ABSTRACT

The present invention provides a capacitor charging circuit that efficiently charges capacitive loads. In particular, circuits and techniques are preferably provided for using current from both the primary and secondary windings of a transformer to control ON-time and OFF-time of a switch. This arrangement preferably yields an adaptable ON-time and adaptable OFF-time switch that is capable of rapidly charging capacitor loads ranging from as low as zero volts to several hundred volts. The output voltage is preferably measured indirectly to prevent unnecessary power consumption. In addition, control circuitry can be provided to conserve power by ceasing the delivery of power to the capacitor load once the desired output voltage is reached. Control circuitry preferably operates an interrogation timer that periodically activates the power delivery cycle to maintain the capacitor output load in a constant state of readiness.

23 Claims, 8 Drawing Sheets

US 6,636,021 B2

CIRCUITS AND TECHNIQUES FOR CAPACITOR CHARGING CIRCUITS

CROSS-REFERENCE TO A RELATED APPLICATION

This is a continuation of U.S. patent application Ser. No. 09/921,466, filed Aug. 3, 2001, which is hereby incorporated by reference herein in its entirety.

BACKGROUND OF THE INVENTION

This invention relates to charging capacitive loads. More particularly, this invention relates to charging capacitive loads in photoflash systems.

In conventional photoflash systems, fixed frequency switching power supply topologies are typically used to provide power to a capacitive load. For example, in fixed frequency applications, a portion of the period associated with the frequency can be used to turn a power switch (e.g., transistor) ON and another portion of the period can be used to turn the switch OFF. A ratio of ON-time $T_{ON}$ versus OFF-time $T_{OFF}$ can be set to adjust the duty ratio applied to the power switch. During ON-time, the power switch is activated and then during OFF-time, the power switch is OFF. The $T_{OFF}/T_{ON}$ ratio can be adjusted to provide the appropriate power to the capacitive load during the switching cycle of the switching power supply. Typical DC-to-DC converters, for example, employ this technique. Therefore, under varying load conditions or output voltage requirements, conventional switching power supply topologies can adjust the $T_{OFF}/T_{ON}$ ratio to meet output voltage and load requirements.

This approach as it relates to photoflash systems, however, has several potential problems. One problem is that the photoflash capacitor voltage can vary continuously from, for example, 0V at the start of a charging cycle to 300V at the end of the charging cycle. This wide variation in voltages can put demands that are impractical to implement on conventional power switching supplies. For example, some conventional switching power supplies may not have the capability to adjust the $T_{OFF}/T_{ON}$ ratio to provide power to charge output capacitor loads that vary over a wide voltage range.

Another potential problem that may occur with conventional power switching supplies is that the output voltage feedback mechanism used to monitor the output voltage can be a source of constant power dissipation. For example, a feedback mechanism may include a resistor divider coupled between the output capacitor load and ground. During operation, this coupling exhibits an $I^2R$ power loss. Furthermore, several tens of microamps may be required to be conducted in the resistor divider to minimize the affect of finite input impedance of the feedback mechanism. In addition, when the conventional switching supply operates to maintain a relatively high output voltage (e.g., 300V), the feedback mechanism can dissipate several milliwatts. Since it is desirable to maintain the capacitor voltage at flash ready status, the feedback mechanism has to constantly monitor the capacitor voltage to ensure that the proper voltage is maintained, thus creating an undesirable long term power loss.

Another problem that can occur with conventional switching power supplies is that the switching action required to obtain the proper output voltage cannot be stopped. Instead, the conventional switching power supply continuously adjusts the $T_{OFF}/T_{ON}$ ratio to maintain a constant output voltage relative to a given load. In other words, the conventional switching power supply continues to supply power to the load even when the desired capacitor voltage has been reached. This can add additional power losses that reduce the efficiency of conventional photoflash systems.

SUMMARY OF THE INVENTION

Therefore, it is an object of this invention to provide a power switching topology that delivers power to a capacitive load over a wide range of capacitor load voltages.

It is also an object of this invention to provide a feedback mechanism that measures the capacitor voltage that is substantially independent of a continuous power drain.

It is also an object of this invention to limit power delivery when the photoflash capacitor reaches its desired voltage.

Therefore, circuits and techniques including power delivery circuitry, measuring circuitry, and control circuitry for a capacitor charging circuit are provided. The power delivery circuitry may implement a self-clocking switch mechanism to transfer power from a power source to an output capacitor load. Moreover, the power delivery circuitry can include ON-time circuitry and OFF-time circuitry. The ON-time circuitry preferably uses the current in the primary winding to generate signals that control the ON-time of a power switch (e.g, transistor). Once the primary current reaches a predetermined threshold, the signal generated by the ON-time circuitry turns the power switch OFF, thus causing the power switch to go into OFF-time. The OFF-time circuitry preferably uses the current in the secondary winding to generate signals that control the OFF-time of the power switch. When the secondary current reaches a predetermined value, the signal generated by the OFF-time circuitry turns the power switch ON. The signals generated by the ON-time and OFF-time circuitry are received and coordinated by a latch to form a cycle having switch ON-time and switch OFF-time.

The power delivery circuitry operates as follows. During ON-time, the switch is activated and the transformer is energized until the switch is deactivated. When the transformer energizes, the current in the primary side of the transformer increases until the voltage across a resistor, which may conduct all or a portion of the primary current, in the ON-time circuitry is greater than an ON-time reference voltage. Once the voltage is greater than the reference voltage, the ON-time circuitry can generate a signal that causes the latch to turn OFF the switch, thus activating the OFF-time portion of the switching cycle.

During OFF-time, the transformer de-energizes as the current in the secondary side of the transformer is used to charge the load. During charging, the secondary current may decrease until the voltage across a resistor, which conducts all or a portion of the secondary current, in the OFF-time circuitry is less negative than an OFF-time reference voltage. Once the voltage is less negative than the reference voltage, the OFF-time circuitry can generate a signal that causes the latch to reactivate the switch (i.e., return to ON-time). The ON-time/OFF-time cycle can repeat indefinitely until the output voltage has reached a desired voltage.

This architecture may be considered current based because it determines the ON-time and the OFF-time as a result of the current through the primary and secondary windings of the transformer. This current-based switching arrangement can provide a versatile and adaptable switching topology that yields fast and efficient transfer of power to capacitive loads. In particular, both the switch-ON time and switch-OFF time can be adaptable to conditions present in the circuit. For example, the ON-time/OFF-time cycle can exhibit a high degree of flexibility in providing power to charge capacitive loads ranging from zero volts to several hundred volts. The adaptable switch topology can also adapt automatically for variations in the power supply input voltage. For example, if the input voltage is lower than average, the ON-time circuitry may not deactivate the power switch as soon as if the input voltage was relatively average. In this way, the power delivery circuitry can energize the transformer to substantially the same level even though the input voltage is lower.

The measuring circuitry of the present invention provides the capacitor charging circuit with the ability to indirectly measure the output capacitor load voltage by monitoring the voltage waveform on the primary transformer winding during the OFF-time cycle. Measuring the voltage on the primary transformer winding during the OFF-time cycle can provide the capacitor charging circuit with the ability to reduce wasteful power consumption.

During measurement, the voltage waveform from the primary transformer winding is preferably converted to a ground-referred voltage. The ground-referred voltage may be an instantaneous representation of the output capacitor load voltage. This ground-referred voltage can be compared to a reference voltage to determine if the output voltage has reached a desired value. If the output voltage reaches the desired voltage, the measuring circuitry can provide an output signal to the control circuitry. The output signal preferably indicates that the desired capacitor load voltage has been reached.

If the control circuitry receives a signal from the measuring circuitry indicating that the capacitor load voltage has reached the desired voltage, the control circuitry can temporarily disable the power delivery circuitry. Disablement of the power delivery circuitry saves power because additional switching cycles no longer occur (until switching cycles are required again to charge the capacitive load). Moreover, an interrogation timer can be programmed to maintain the power delivery circuitry in a disabled state for a variable period of time. Once the programmable period of time runs out, the interrogation timer can generate a signal that automatically causes the control circuitry to re-enable the power delivery circuitry. When, for example, the timer times out, the control circuitry can enable the power delivery circuitry until the output voltage returns to the desired voltage. Once the desired voltage is obtained, the control circuitry can disable the power delivery circuitry again for a specified time, a variable period of time or flash event.

The control circuitry can cycle between the activated/de-activated modes to maintain a constant desired voltage in a preferred range on the output capacitor load. Assuming that no flash events occur, this cycle can run continuously to automatically compensate for voltage drops in the output capacitor load voltage. For example, capacitor load voltages can drop as a result of capacitor self-discharge.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
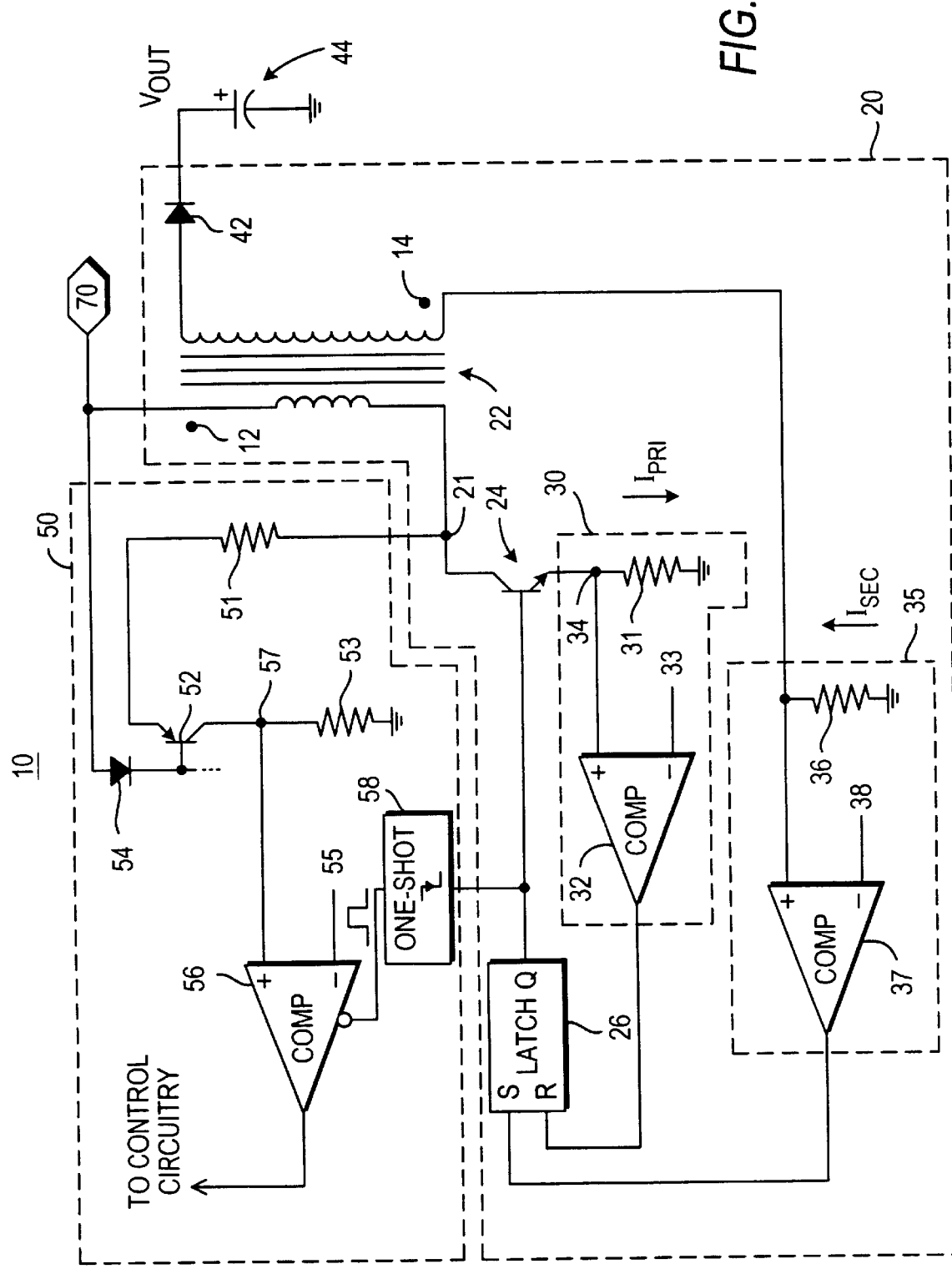
FIG. 1 is a circuit diagram of power delivery circuitry and measuring circuitry according to the principles of the present invention.

Circuits and techniques for providing high efficiency charging of capacitive loads are provided. In particular, circuits and techniques are provided for charging capacitive loads in photoflash systems.

In conventional photoflash capacitor charging circuits, conventional switching power supplies may be implemented to charge an output capacitor to a desired output voltage. The conventional switching power supply may charge the output capacitor by adjusting the $T_{OFF}/T_{ON}$ ratio of the switching cycle to obtain the desired output voltage.

However, conventional photoflash capacitor charging circuits present a number of potential problems, as described above. The conventional capacitor charging circuit may measure the output voltage using a resistor divider, which can produce an undesirable power loss. Other problems may involve the inability of the conventional switching power supply to efficiently charge a capacitive load for continuously varying output voltages. A photoflash capacitor charging circuit constructed according to the present invention overcomes these problems by providing adaptable power delivery circuitry, minimal power consumption measuring circuitry, and control circuitry each according to the invention.

A photoflash capacitor charging circuit according to the principles of the present invention operates as follows. First, if the output voltage is too low, the control circuitry enables at least the power delivery circuitry. The power delivery circuitry switches a power switch (e.g., a transistor) ON and OFF to provide (DC-to-DC converter) switch functionality required by the capacitor charging circuit. For example, the power switch can be a bipolar transistor, which can function as part of a switching mechanism for the capacitor charging circuit.

When the power delivery circuitry turns the switch ON, a transformer is energized by a power source. The switch remains ON and the transformer continues to be energized until an ON-time voltage (which may be related to the primary current level), is greater than an ON-time reference voltage. Then the switch turns OFF. When the switch turns OFF, the transformer is no longer energized by the power source, but is de-energized by transmitting power to the output capacitor load. The capacitor continues to become charged until an OFF-time voltage (which may be related to the secondary current level), exceeds an OFF-time reference voltage, at which point, the switch can turn ON again.

The ON-time and OFF-time switching preferably provides the capacitor charging circuit of the present invention with inherent self-clocking (i.e., the capacitor charging circuit is independent of an additional oscillator or clock). Moreover, switch ON-time and switch OFF-time are adaptable to operational parameters such as varying input source voltages, varying output voltages, and other parameters associated with the capacitor charging circuit. This adaptability for varying ON-time and OFF-time of the switch provides the capacitor charging circuit with the ability to adjust the ON-time/OFF-time cycle to efficiently provide power to the output capacitor load operating on a wide voltage range.

Once the voltage on the output capacitor reaches a desired value, the control circuitry may disable the power delivery circuitry and the measuring circuitry (e.g., by stopping the delivery of power to the power delivery circuitry and measuring circuitry). This may conserve power because the power delivery circuitry and the measuring circuitry no longer operate once the desired output voltage is reached.

In an alternative embodiment, the control circuitry may disable and/or disconnect only the measuring circuitry when the desired output voltage is reached. In this embodiment, the measuring circuitry is disconnected, while other circuitry, such as the power delivery circuitry remains enabled. Thus, this embodiment provides the capacitor charging circuit with the ability to rapidly re-charge the load.

In another alternative embodiment, the control circuitry may disable and/or disconnect the power delivery circuitry and the measuring circuitry when the desired output voltage is obtained. However, in this embodiment, the measuring circuitry is reactivated (after a pre-determined period of time), but not the power delivery circuitry. This may provide additional power consumption savings for the capacitor charging circuit.

Nevertheless, when power is no longer being supplied to the capacitive load, the voltage can gradually drop due to self-discharge. The control circuitry can compensate for this inherent problem by periodically reactivating the power delivery circuitry after a programmable period of time or flash event. When reactivated, the power delivery circuitry can either be turned off immediately if the voltage level is at or above the desired voltage, or run until the output voltage returns to the desired voltage. Once the desired voltage is obtained, the control circuitry can disable the power delivery circuitry and the measuring circuitry again to conserve power. This provides the capacitor charging circuit with the ability to maintain the output capacitor load in a constant state of readiness despite the inherent self-discharge associated with capacitive loads.

Another aspect of the invention is that maximum power transfer can preferably be achieved during capacitor load charging. This may be achieved by preventing flux in the transformer from reaching zero during power delivery (at least until the end of the final switch cycle). During ON-time, the primary winding current increases. Since flux is proportional to current, the flux in the transformer also increases. Then during OFF-time, the current and flux both decrease. However, throughout the ON-time portion of the switching cycle, the primary winding current does not go to zero. Similarly, during OFF-time, the secondary winding current also does not go to zero. Since the primary and secondary winding currents do not go to zero during ON-time and OFF-time respectively, the flux, therefore, does not go to zero. Thus, the power delivery circuitry may be able to maintain a relatively high average current (and flux) during the combined respective ON-time and OFF-time cycle. This higher average current (and flux) may provide the capacitor charging circuit with the ability to rapidly charge capacitive loads.

Another aspect of the invention involves measuring the voltage on the output capacitor load with minimal power drain on the power source (e.g., battery). The measuring circuitry according to the present invention indirectly measures output voltage during the OFF-time cycle (e.g., flyback cycle) by converting the voltage on the primary side of the transformer to a ground-referred voltage. This ground-referred voltage is directly proportional to the instantaneous output voltage. The ground-referred voltage may then be compared to a reference voltage to determine if the desired output voltage has been obtained. Moreover, since there is substantially no current in the primary winding of the transformer during the OFF-time switch cycle, there is very limited power loss during measurement.

Another aspect of the invention is that the measuring circuitry accurately measures the output voltage despite voltage spikes produced by leakage inductance in the transformer. At the beginning of each OFF-time cycle, the output of the measuring circuitry is temporarily delayed to prevent the measuring circuitry from monitoring the portion of the voltage waveform exhibiting the leakage inductance voltage spike. Thus, measuring circuitry according to the invention preferably can accurately measure the output voltage independently of voltage spikes.

Another aspect of the invention is that the input current drawn from a power source can be accurately controlled when charging a load. When charging the load, input current is drawn by the power delivery circuitry during the ON-time portion of the ON/OFF-time cycle. In addition, the peak-current drawn from the power source is substantially the same for each ON-time portion of the ON/OFF-time cycle. This provides a regulated power drain from the source, which can result in less power consumption. For example, if batteries are used for the capacitor charging circuit, then the controlled draw of current during ON-time can increase the battery's life.

Figure 3:
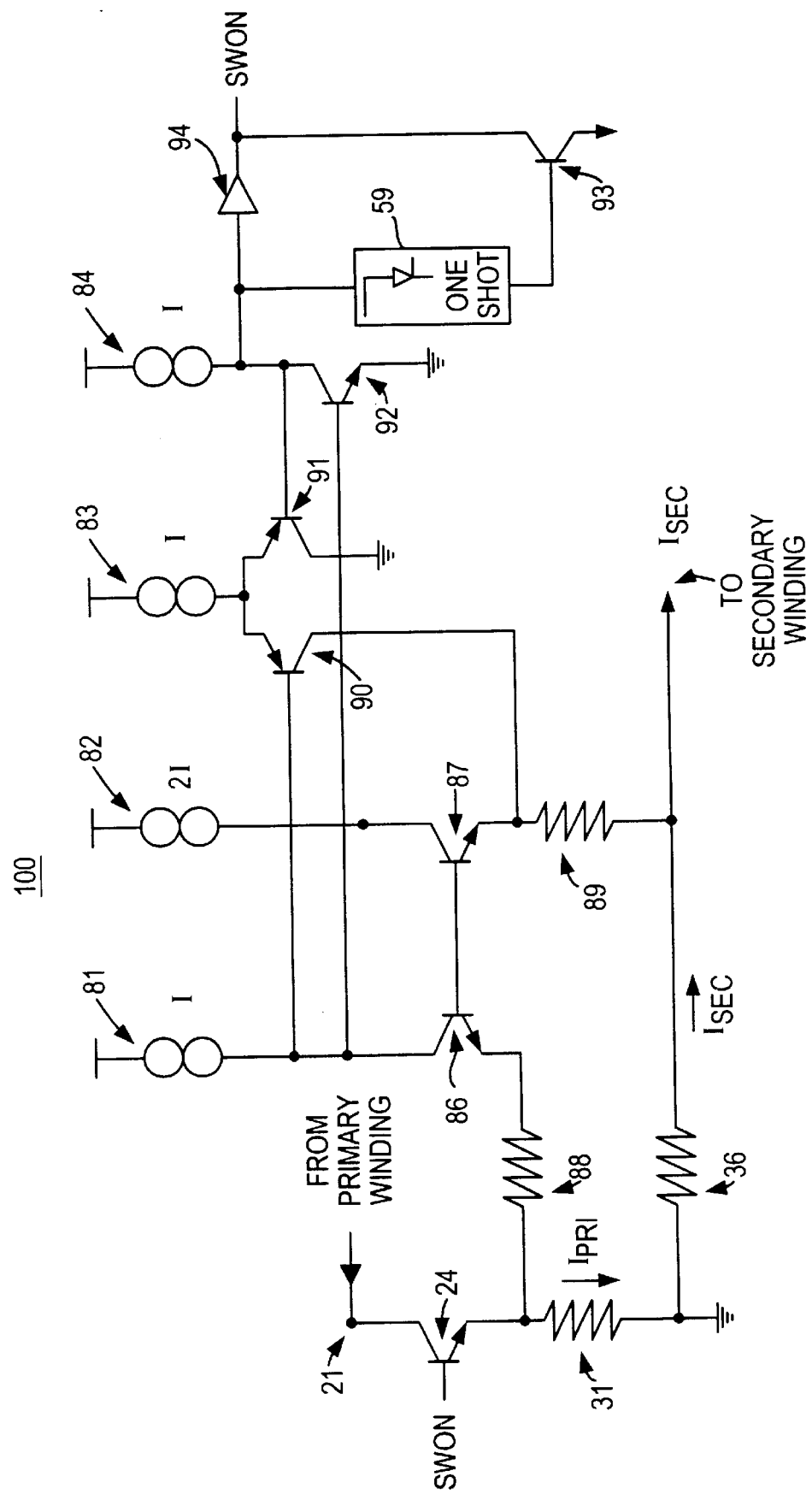
FIG. 3 is a circuit diagram of current comparator circuitry according to the principles of the present invention.
Figure 5:
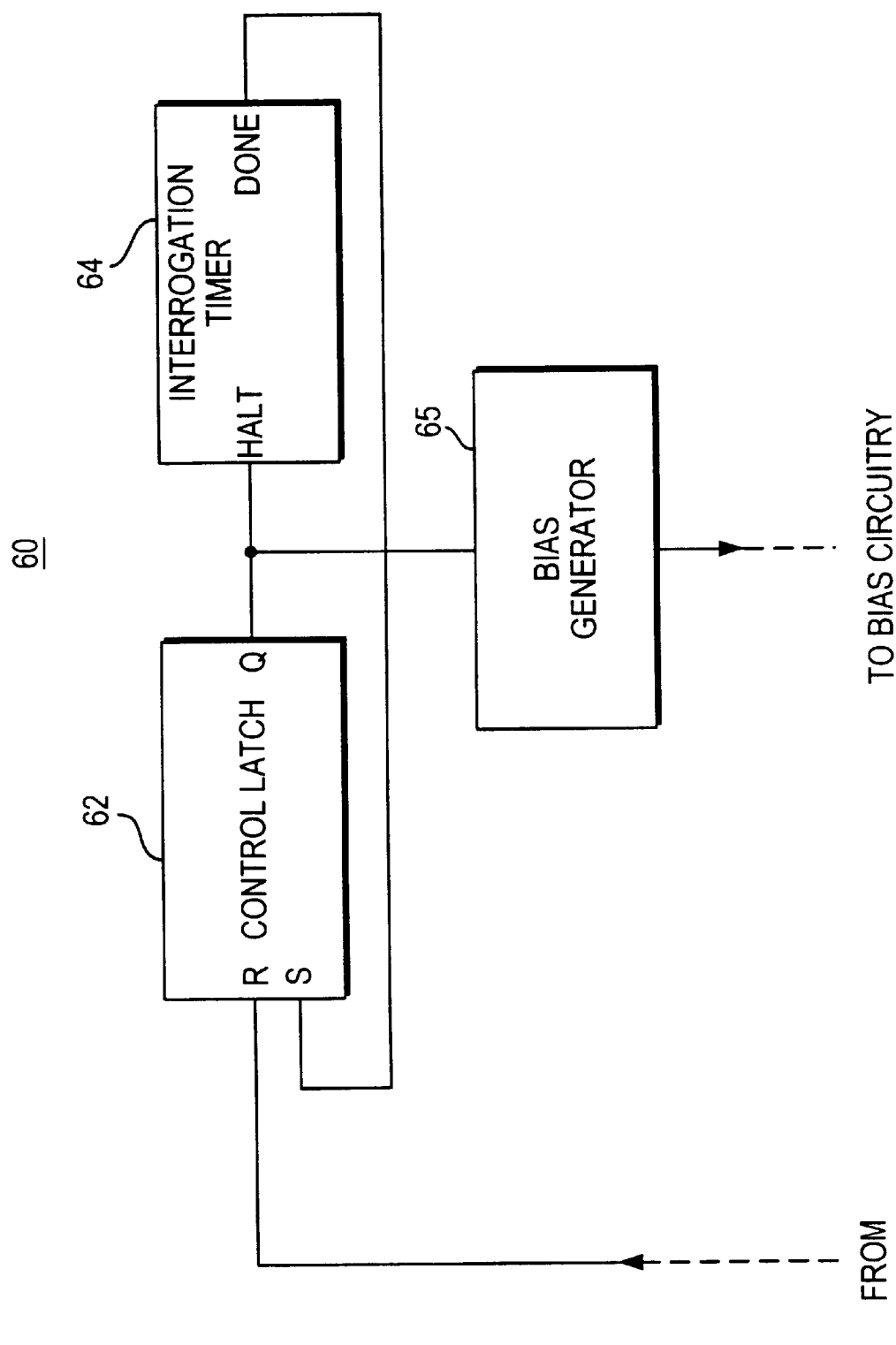
FIG. 5 is a block diagram of control circuitry according to the principles of the present invention.

FIG. 1 shows a circuit diagram of capacitor charging circuit 10 according to the invention. This FIGURE illustrates power delivery circuitry 20 and measuring circuitry 50, which may represent two of the three sub-circuits of the invention. FIG. 3 shows a circuit diagram of current comparator circuitry 100 according to the invention. This FIGURE illustrates another embodiment of a portion of power delivery circuitry 20. FIG. 5 shows a block diagram of control circuitry 60, which may represent the third main sub-circuit of the invention.

First, operation of capacitor charging circuitry 10 shown in FIG. 1 will be described in detail with respect to the portion of the specification corresponding to FIGS. 1 and 2. Then the operation of current comparator circuitry 100 shown in FIG. 3 will be described in detail with respect to the specification corresponding to FIGS. 3 and 4. Lastly, the operation of control circuitry 60 shown in FIG. 5 will be described in detail with respect to the portion of the specification corresponding to FIG. 5 and 6.

In FIG. 1, power delivery circuitry 20 operates to transfer power from input source 70 to capacitor 44 (which is preferably coupled to the load). Power delivery circuitry 20 can include adaptive ON-time circuitry 30, adaptive OFF-time circuitry 35, transformer 22, switch transistor 24, latch 26, and output diode 42. Power delivery circuitry 20 may be coupled to the output capacitor 44 via output diode 42. The anode of output diode 42 can be coupled to the output side of the secondary winding of transformer 22 and the cathode of output diode 42 can be coupled to output capacitor 44. Input source 70 can be coupled to the input of the primary side of transformer 22. The output of the primary side of transformer 22 can be coupled to the collector of switch transistor 24. The emitter of switch transistor 24 can be coupled to adaptive ON-time circuitry 30.

The polarity orientation of the primary and secondary windings are preferably arranged so that the respective windings have opposite polarity. As illustrated in FIG. 1, polarity indicators 12 and 14 show that the polarity of the primary and secondary windings are opposite. This opposite polarity can be useful for implementing a flyback circuit topology.

Adaptive ON-time circuitry 30 may include first switch resistor 31, which can be coupled to the emitter of switch transistor 24 to form ON-time node 34. ON-time circuitry 30 can also include ON-time comparator 32. ON-time comparator 32 can be coupled to receive voltage signals from ON-time node 34 and ON-time reference voltage $V_{REF1}$ 33.

Adaptive OFF-time circuitry 35 can include second switch resistor 36, which may be coupled to the secondary winding of transformer 22 and to non-inverting terminal of OFF-time comparator 37. OFF-time comparator 37 can also receive OFF-time reference voltage $-V_{REF2}$ 38. OFF-time reference voltage $-V_{REF2}$ 38 is negative because it may be compared to the negative voltage across second switch resistor 36.

Adaptive ON-time circuitry 30 and adaptive OFF-time circuitry 35 each provide output signals that are received by latch 26. Latch 26 can be, for example, a set/reset latch. In particular, the reset portion of latch 26 can be coupled to receive the output of ON-time circuitry 30 and the set portion of latch 26 can be coupled to receive the output of OFF-time circuitry 35. In the embodiment shown in FIG. 1, if latch 26 receives signals simultaneously for both set and reset, the reset input preferably takes priority. Latch 26 can provide a latch output to the base of switch transistor 24 based on output signals provided by ON-time circuitry 30 and OFF-time circuitry 35. The latch output can be toggled to activate or de-activate switch transistor 24 to generate the switching action necessary for DC-to-DC conversion. Thus, the interconnections of the respective components of an embodiment of power delivery circuitry 20 according to the invention have been described. The preferable operation of power delivery circuitry 20 will be described next.

During initial power up, no current is flowing in either the primary or secondary windings of transformer 22. The output of ON-time circuitry 30 is initially preferably set low and the output of OFF-time circuitry 35 is initially preferably set high. The state of adaptive circuitry 30 and 35 sets latch output to high, which activates switch transistor 24. Once switch transistor 24 is activated, collector node $V_{SW}$ 21 can be pulled close (i.e., 200–300 millivolts) to one $V_{CESAT}$ of ground. This preferably creates a voltage differential across the primary winding of transformer 22 and starts the flow of current into the transformer.

Current can continue to ramp up in the primary winding until it increases to the point that the voltage across first switch resistor 31 (i.e., voltage at ON-time node 34) exceeds $V_{REF1}$ 33. The voltage across first switch resistor 31 may be based on a portion of the primary current passing through switch transistor 24. When the primary winding current ramps up, the energy stored in the transformer also increases. Once the voltage at ON-time node 34 exceeds $V_{REF1}$ 33, the output of ON-time circuitry 30 can be set high to reset latch 26, which causes the latch output to go low.

The reset latch de-activates transistor 24, thus preferably terminating current ramp up in the primary side of transformer 22.

When switch transistor 24 is de-activated, the energy stored in transformer 22 during ON-time is transferred to capacitor 44. This transfer preferably occurs substantially during OFF-time. Output diode 42 may prevent output capacitor load from drawing current from the secondary winding of the transformer during ON-time. The energy transfer from the secondary winding to output capacitor 44 continues until the current in the secondary winding of the transformer drops to the point where the voltage across second switch resistor 36 is preferably less negative than OFF-time reference voltage $-V_{REF2}$ 38.

Once the voltage across second switch resistor 36 is greater than $-V_{REF2}$ 38, OFF-time circuitry 35 output can be set low to set latch 26. The set latch produces a high output signal that activates switch transistor 24.

ON-time circuitry 30 and OFF-time circuitry 35 may preferably use currents in transformer 22 to generate the ON-time portion and OFF-time portion of the switching cycle. In particular, ON-time circuitry 30 may set the ON-time portion based at least in part on the primary winding current, the inductance of the primary winding, and the supply voltage. OFF-time circuitry 35, on the other hand, may set the OFF-time portion based at least in part on the secondary winding current, the inductance of the secondary winding, and the output voltage. This arrangement can provide a self-clocking circuit that is suitable for charging capacitive loads varying over a wide voltage range (e.g., 0–300 V). In particular, ON-time circuitry 30 and OFF-time circuitry 35 are adaptive to various conditions (e.g., input supply voltage, output voltage, inductance of the primary and secondary windings of the transformer) in the capacitor charging circuit. Adaptive OFF-time can enable the secondary winding current to decrease to a pre-determined current level, independent of the output voltage, during each OFF-time portion of the switching cycle.

For example, when the capacitor load voltage is relatively low (e.g., 0 V), energy is removed from the transformer at a slower rate (than if the load voltage were high (e.g., 250 V). Thus, OFF-time circuitry 35 automatically adapts by keeping switch transistor 24 OFF until the secondary current falls to a pre-determined current level. That is, OFF-time circuitry 35 may provide a variable OFF-time before generating the signal needed to set latch 26 (i.e., turn-ON switch transistor 24).

Conversely, if the capacitor load voltage is relatively close to the desired output voltage, energy is removed rapidly from the transformer. In this case, switch transistor 24 may remain OFF for a relatively short period of time (at least compared to the OFF-time when the capacitor load voltage is low). Thus, the secondary current is reduced relatively rapidly and OFF-time circuitry 35 correspondingly rapidly generates the required signal to set latch 26.

Adaptive ON-time, on the other hand, can enable the primary winding current to increase to substantially the same peak primary current during each ON-time portion of the switching cycle. For example, ON-time circuitry 30 can automatically adapt to varying input voltages provided by power source 70. As described earlier, ON-time circuitry 30 generates signals based on the current in the primary winding. The current in the primary winding varies substantially proportionally to the voltage level of power source 70. In particular, ON-time circuitry 30 resets latch 26 when the current in the primary winding reaches a predetermined current level. Since resetting the latch is dependent on reaching that predetermined current level, this provides ON-time circuitry with the ability to automatically adapt to changing input voltages and provide a variable ON-time.

For example, if the input voltage provided by power source 70 is low, ON-time circuitry 30 can automatically keep switch transistor 24 activated (e.g., remain in ON-time) for a longer period of time. Keeping switch transistor 24 activated longer allows the current in the primary winding to reach the predetermined level. Once the primary current reaches the predetermined level, the transformer may be fully energized according to the operating parameters of the present invention. In other words, the rate at which the current increases in the primary winding may be substantially proportional to the input voltage.

It should be noted that certain simultaneously occurring conditions may create contradictory demands on power delivery circuitry 20. For example, if the input voltage drops (thereby demanding increased ON-time), while the output level drops (thereby requiring increased OFF-time), the capacitor charging circuit can satisfy both demands by adapting the ON-time and OFF-time accordingly. That is, the demands are automatically adapted to during the successive ON-time and OFF-time portions of the ON/OFF-time cycle after the simultaneous demands occur.

The ON-time and OFF-time cycle can be repeated substantially indefinitely until capacitive load 44 is fully charged. FIG. 2 shows various waveforms that depict currents and voltages preferably associated with ON-time and OFF-time cycles of a circuit according to the present invention. Q indicates when switch transistor 24 is either ON or OFF. $I_{PRI}$ shows the current waveform provided with the primary winding of transformer 22. When Q is ON, the current in $I_{PRI}$ ramps up until Q turns OFF (i.e., ON-time node voltage 34 is greater than $V_{REF1}$ 33)). $I_{SEC}$ shows the current waveform provided with the secondary winding of transformer 22. When Q is OFF, the current in $I_{SEC}$ ramps down until Q turns ON (i.e., voltage across second switch resistor 36 is less negative than $-V_{REF2}$ 38). Then the current in $I_{SEC}$ turns OFF in part because of the operation of diode 42.

During power delivery circuitry 20 operation, the flux in transformer 22 may preferably never substantially go to zero. As commonly known in the art, flux in the transformer is substantially dependent on the current in both $I_{PRI}$ and $I_{SEC}$. As $I_{PRI}$ increases, the flux in transformer 22 may also increase until the power switch turns OFF (as indicated by Q). The switch may turn OFF when the $I_{PRI}$ is substantially equivalent to $V_{REF1}$/(first switch resistor 31) (i.e., current which may cause ON-time circuitry 30 to reset latch 26 and turn OFF switch 24). Once switch 24 is turned OFF, $I_{PRI}$ returns to zero and $I_{SEC}$ rapidly rises to a current that is preferably equivalent to the peak $I_{PRI}$ divided by the turns ratio of the transformer winding. Then for the remainder of OFF-time, $I_{SEC}$ declines as $I_{SEC}$ charges capacitor load 44.

The flux, however, does not go to zero because the $I_{SEC}$ is not permitted to return to zero during OFF-time. Instead, the flux decreases in conjunction with the decreasing $I_{SEC}$ until switch 24 is reactivated. As shown in FIG. 2, switch 24 turns ON when $I_{SEC}$ is substantially equal to $V_{REF2}$/(second switch resistor 36). Then, during the transition period from OFF-time to ON-time, $I_{SEC}$ may go to zero. Nevertheless, during this transition, $I_{PRI}$ may rapidly rise to a current level substantially equal to ($I_{SEC}$ (at transition) X the transformer turns ratio). Then, $I_{PRI}$ may increase throughout the duration of the ON-time portion of the cycle. Thus, it has been shown that some flux is preferably always in transformer 22.

During the switching cycle $I_{PRI}$ does not go to zero during ON-time and $I_{SEC}$ does not go to zero during OFF-time. Thus, the average current applied to and delivered from transformer 22 can be substantially higher. This may provide fast and efficient energy transfer from power source 70 to capacitive load 44 because the average current (and flux in the transformer) is higher than it would be if the current were allowed to go to zero during the respective portions of the switching cycle. Since the flux in transformer 22 is not permitted to go to zero, the undesirable ringing or buzzing associated with discontinuous mode operation can be substantially avoided (preferably at least until the end of the final switch cycle). Thus, the operation of one embodiment of power delivery circuitry 20 has been described in detail. Another embodiment of power delivery circuitry 20, current comparator circuitry for controlling the ON and OFF times of switch transistor 24 may be implemented.

FIG. 3 shows a circuit diagram of current comparator circuitry 100 that may implemented in a power delivery circuit 20 according to the invention. Current comparator circuitry 100 may be used in power delivery circuitry 20 for controlling the ON-time and OFF-time of switch transistor 24. As will be explained in more detail, current comparator circuitry 100 may perform substantially the same functions as ON-time circuitry 30, OFF-time circuitry 35, and latch 26. FIG. 3 may include $V_{SW}$ 21, switch transistor 24, first switch resistor 31, second switch resistor 36, first transistor 86, second transistor 87, third resistor 88, forth resistor 89, current sources 81–84, first feedback transistor 90, second feedback transistor 91, switch driving transistor 92, one-shot transistor 93, one-shot 59, and amplifier 94.

Some of the components-shown in FIG. 3 have properties and relationships with other components that enable current comparator circuitry 100 to operate efficiently. For example, the emitter size (e.g., area) of second transistor 87 is substantially twice that of first transistor 86. The resistance values of third and fourth resistors 88 and 89 may be substantially the same. The resistance values of third and fourth resistors 88 and 89 may be substantially greater than the resistance value of first and second switch resistors 31 and 36. Furthermore, the resistance value of third and fourth resistors 88 and 89 can be based on the turns ratio of transformer 22. It will become more apparent in the following description why certain components exhibit their respective characteristics.

The connection involving $V_{SW}$ 21 switch transistor 24, and first switch resistor 31 have been previously described, but will be repeated for purposes of describing the operation of the circuitry shown in FIG. 3. $V_{SW}$ 21 can be coupled to the collector of switch transistor 24. $V_{SW}$ 21 can also be coupled to the primary winding of transformer 22 (as shown in FIG. 1). The emitter of switch transistor 24 can be coupled to both first switch resistor 31 and third resistor 88. First switch resistor 31 may also be coupled to second switch resistor 36, which goes to GND. Second switch resistor 36 can be coupled to the secondary winding of transformer 22 (not shown in FIG. 3). Second switch resistor 36 may also be coupled to forth resistor 89, thus forming a node where second switch resistor 36, forth resistor 89 and the secondary winding are coupled.

Current source 81 can be coupled to the collector of first transistor 86 and to the bases of first feedback transistor 90 and switch driving transistor 92. The emitter switch driving transistor 92 may be coupled to GND. The emitter of first transistor 86 may be coupled to third resistor 88. The base of first transistor 86 and the base of second transistor 87 can be coupled together. However, these bases are also coupled to a node formed between current source 82 and the collector of second transistor 87. Therefore, the bases of both first transistor 86 and second transistor 87 can be driven by current source 82. The emitter of second transistor 87 can be coupled to fourth resistor 89 and to the collector of first feedback transistor 90.

Current source 83 can be coupled to the emitters of first feedback transistor 90 and second feedback transistor 91. Current source 84 can be coupled to the collector of switch driving transistor 92, amplifier 94 and to base of second feedback transistor 91. The collector of second feedback transistor 91 is coupled to GND. The output of amplifier 94 can be connected to the base of switch transistor 24, which is shown as SWON node 95, and to the collector of one-shot transistor 93. The emitter of one-shot transistor 93 is coupled to GND. Finally, one-shot circuitry 59 can be coupled between the base of one-shot transistor 93 and the collector of switch driving transistor 92.

The operation of these heretofore described components shown in FIG. 3 will be described next. The previous discussion on power delivery circuitry 20 described the comparison of voltages to switching between ON-time and OFF-time. However, the operation of the components in FIG. 3 is primarily described in with respect to the current flowing in current comparator circuitry 100. In the embodiment shown in FIG. 3, current can be the primary agent that facilitates switching between ON-time and OFF-time in power delivery circuitry 20. Therefore, current comparator circuitry 100 may use current to vacillate switch transistor 24 between ON-time and OFF-time.

The graphical depictions of various signals shown in FIG. 4 will be referred to in the following description of the operation of current comparator circuitry 100 shown in FIG. 3. For purposes of the following description, switch transistor 24 may be considered active at start-up of current comparator circuitry 100. Furthermore, the following description refers to current and voltage waveforms in FIG. 4 to illustrate CC 100 operation.

Figure 4:
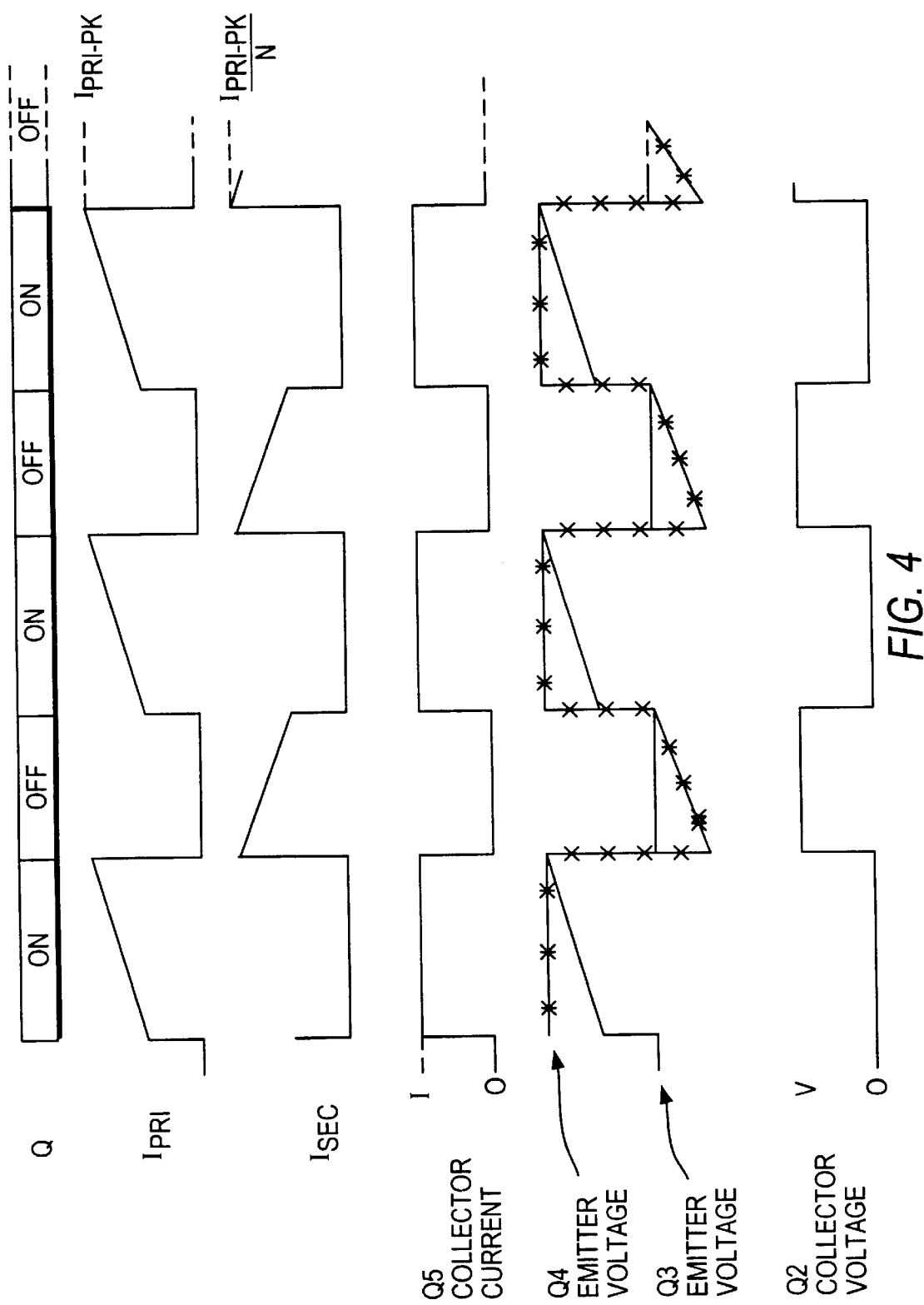
FIG. 4 shows illustrative waveform diagrams of current comparator circuitry according to the principles of the present invention.

When switch transistor 24 is active, the collector voltage of first transistor 86, which is shown as Q2 in FIG. 4, is low. It follows that the collector voltage of switch driving transistor 92 is high when switch 24 is active. Switch driving transistor 92 may provide the voltage and/or current necessary to activate switch transistor 24 and to maintain switch transistor 24 in an active state. In other words, the collector voltage of switch driving transistor 92 can perform a similar function to the output of latch 26 (as shown in FIG. 1). Switch driving transistor 24 collector voltage is illustrated as Q (ON and OFF of switch 24) in FIG. 4.

When switch transistor 24 is active, the primary winding current passing through first switch resistor 31 is increasing. FIG. 4 graphically illustrates this point by showing $I_{PRI}$ as increasing when switch transistor 24 is active.

Also, as $I_{PRI}$ increases, the emitter voltage on first transistor 86 may also increase. The emitter voltage of first transistor 86 is illustrated in FIG. 4 as Q3. The proportionality of the emitter voltage on first transistor 86 to $I_{PRI}$ may be shown by the following equation:

$$V_{EQ3(ON)} = (I_{PRI} * R_{s1}) + (I * R_3) \quad (1)$$

where $V_{EQ3(ON)}$ is the emitter voltage on first transistor 86 during ON-time, $I_{PRI}$ is the current in the primary winding, $R_{s1}$ is the resistance of first switch resistor 31, I is the emitter current of transistor 86 provided by current source 81, and $R_3$ is the resistance of third resistor 88.

During ON-time, the current in the secondary winding of transformer 22 is substantially zero. This is shown in FIG. 4 in the waveform labeled $I_{SEC}$. Since $I_{SEC}$ is substantially zero, the emitter voltage of second transistor 87 (during ON-time) may be substantially equal to:

$$V_{EQ4(ON)} = 3I(R_4 + R_{S2}) \quad (2)$$

where $V_{EQ4(ON)}$ is the emitter voltage on second transistor 87 during ON-time, I is the emitter current of transistor 87, $R_4$ is the resistance of fourth resistor 89, and $R_{S2}$ is the resistance of second switch resistor 36. Three times the current (I) is shown in equation 2. A portion of this current (i.e., 2I of the 3I) is provided by current source 82. Second transistor 87 can conduct twice the current of first transistor 86 because the emitter area is twice that of first transistor 86. The other portion of the current (i.e., the remaining I) is provided by current source 83 since first feedback transistor 90 is active during ON-time. Thus, the waveform for this voltage (i.e., $V_{EQ4(ON)}$) is shown in FIG. 4 as Q4.

As shown in FIG. 4, Q4 is substantially constant during ON-time. This may be the result of positive feedback current conducted by first feedback transistor 90. During ON-time, first feedback transistor is activated because the collector voltage of first transistor 86 is low, thus allowing a collector current substantially equal to the current provided by current source 83 to be passed through first feedback transistor 90. Q5 in FIG. 4 shows that a relatively high and constant collector current is supplied when Q2 is low. This substantially constant current preferably maintains the constant emitter voltage of transistor 87 during ON-time (or, alternatively, ON-cycle). The raised emitter voltage may provide an increased voltage differential at the emitter of transistor 86 between the start and the end of ON-time.

The emitter voltage of transistor 86 increases until the point that it is higher than the emitter voltage of second transistor 87. At this point, transistor 86 turns OFF rapidly because its emitter voltage has increased relative to its base voltage. When transistor 86 turns OFF, the collector voltage of first transistor 86 goes high when the condition of the following is met:

$$I_{PRI} * R_{S1} > 2 * I * R_3 \quad (3)$$

assuming that resistance values of third and fourth resistors 88 and 89 are substantially equal. This relationship also assumes that the resistance value of second switch resistor 36 is substantially less than the resistance value of fourth resistor 89. As shown in equation 3, the relationship between $I_{PRI}$ and a constant current source, I, determines when the transition from ON-time to OFF-time takes place. Just prior to the transition point (between ON-time to OFF-time), the peak primary current can be substantially equal to:

$$I_{PRI-PEAK} = (2 * I * R_3)/R_{s1} \quad (4)$$

Once the collector voltage of transistor 86 goes high, this causes the collector voltage of switch driving transistor 92 to go low. A low collector voltage of switch driving transistor 92 preferably commences the OFF-time portion of the switching cycle. In addition, the high collector voltage of first transistor 86 causes first feedback transistor 90 to de-activate. This reduces the emitter voltage of transistor 87 at the beginning of the OFF-cycle.

During the initial stage of OFF-time, the low collector voltage of switch driving transistor 92 activates second feedback transistor 91. The activated second feedback transistor 91 shunts the current provided by current source 83 to ground. The combined operation of de-activated first feedback transistor 90 and activated second feedback transistor 91 can provide positive feedback for the OFF-time cycle. In addition, transistor 90 and transistor 91 may provide added flexibility in sizing of resistors 31 and 36.

In particular, when the collector current of first feedback transistor 90 goes low (as shown in FIG. 4), the voltage across resistor 89 decreases. The decrease of the voltage across resistor 89 decreases the voltage at the emitter of transistor 87. This decrease in the emitter voltage of transistor 87 is equivalent to second switch resistor 36 having a larger resistance value. This provides additional flexibility in sizing the resistance value of second switch resistor 36.

Moreover, $I_{SEC}$ rises to a value substantially equal to:

$$I_{SEC}=I_{PRI-PEAK}/N \quad (5)$$

where N is the secondary to primary winding turns ratio of transformer 22. An illustration of this change is shown in FIG. 4. The $I_{SEC}$ waveform rises to the peak secondary current once ON-time switches to OFF-time. Also, at the transition from ON-time to OFF-time, $I_{PRI}$ preferably rapidly goes to zero.

Once power delivery circuitry 20 enters OFF-time, the emitter voltage on first transistor 86 may be reduced to $I^*R_3$ (assuming the resistance value of first switch resistor 31 is substantially less than third resistor 88), whereas during ON-time, the emitter voltage was substantially equal to equation 1. The emitter voltage waveform illustrates a relatively constant voltage (i.e., at $I^*R_3$) during OFF-time. The emitter voltage on transistor 87 may change from equation 2 to the following equation:

$$V_{EQ4(OFF)}=-(I_{SEC}*R_{S2})+2I*R_4 \quad (6)$$

where $V_{EQ4(OFF)}$ is the emitter voltage on transistor 87 during OFF-time. Thus, the differential voltage between emitter voltages of first transistor 86 and second transistor 87 is represented by equation (7).

$$V_{EQ3(OFF)}-V_{EQ4(OFF)}=I_{SEC}*R_{S2}-I*R_3 \quad (7)$$

As $I_{SEC}$ decreases (or, alternatively, decays), the emitter voltage of second transistor 87 rises because the voltage at the node formed between resistor 36 and resistor 89 preferably becomes less negative. This emitter voltage may increase until the emitter voltage of transistor 87 becomes higher than the emitter voltage of first transistor 86. The rising emitter voltage of second transistor 87 is shown in FIG. 4 during the OFF-time portion of the cycle.

It should be noted that when the ON/OFF-time cycle transitions from ON-time to OFF-time commences, $I^*R_3$ should be greater than $I_{SEC}*R_{s2}$. This assures that the secondary winding current can decrease such that $I_{SEC}*R_{S2}$ eventually exceeds $I^*R_3$.

Once the emitter voltage of second transistor 87 rises above the emitter voltage of first transistor 86, transistor 86 preferably becomes active and the collector voltage of first transistor 86 goes low. This may cause the collector voltage of switch driving transistor 92 to go high, thus restarting the ON-time portion of the cycle.

It should be noted that when switch transistor 24 turns OFF, $I_{SEC}$ may not jump instantaneously to $I_{PRI-PEAK}/N$. Parasitic capacitances of transformer 22 and other components may prevent an instantaneous jump to $I_{PRI-PEAK}/N$. Therefore, a finite period of time may be required to charge and overcome parasitic capacitances so that $I_{SEC}$ is provided with enough time to build up to $I_{PRI-PEAK}/N$.

One-shot circuitry 59 may provide the time necessary to overcome the parasitic capacitances. During the transition from ON-time to OFF-time, one-shot circuitry 59 may apply a pulse to the base of one-shot transistor 93. This pulse may briefly activate one-shot transistor 93, which forces SWON node 95 low. The pulse produced by one-shot 59 may hold switch transistor 24 off long enough to overcome the parasitic capacitances of the circuitry by allowing $I_{SEC}$ to build up and to begin fully charging the output capacitance. Thus, the operation of one embodiment of current comparator circuitry 100 has been described in detail. The components of measuring circuitry 50 will now be described.

The voltage of capacitive load 44 can be measured by measuring circuitry 50. Measuring circuitry 50 can include first resistor 51, which is coupled between the collector of switch transistor 24 (shown as collector node $V_{VSW}$ 21) and the emitter of transistor 52. The base of transistor 52 can be coupled to the cathode of diode 54. The anode of diode 54 can be coupled to power source 70. The base of transistor 52 can also be coupled to bias circuitry (not shown), thus providing power to the bias circuitry. Bias circuitry may provide the capacitor charging circuit with the ability to turn-on circuitry such as measuring circuitry 60 and power delivery circuitry 20. The collector of transistor 52 can be coupled to second resistor 53. Measuring circuitry can also include comparator 56 which can receive voltage signals from ground-referred voltage node $V_{GREF}$ 57 (formed between the collector of transistor 52 and second resistor 53) and reference voltage $V_{REF3}$ 55. One-shot circuitry 58, which can also be part of the measuring circuitry, can be coupled to comparator 55 and to the output of latch 26. In an alternative approach, one-shot circuitry 59 (which drives the base of one-shot transistor 93), shown in FIG. 3, may be coupled to comparator 55.

The measuring circuitry according to the present invention can be implemented to reduce wasteful long-term power consumption. The purpose of measuring circuitry 50 is to indirectly measure the capacitor load voltage from the primary side winding of transformer 22. Measuring circuitry 50 can measure the output voltage during OFF-time because there is substantially no current flowing in the primary side winding and because the primary side $V_{VSW}$ node 21 reflects output voltage during this part of the cycle. The voltage at $V_{VSW}$ node 21 can be substantially equal to:

$$V_{VSW}=V_{source}+(V_{OUT}/N)+V_{diode} \quad (8)$$

where $V_{VSW}$ is the voltage on collector node $V_{SW}$ 21, $V_{source}$ is the voltage provided by power source 70, $V_{OUT}$ is the capacitor load voltage, N is the secondary-to-primary transformer turns ratio, and $V_{diode}$ is the voltage drop across diode 42. The $V_{VSW}$ voltage waveform is shown in FIG. 2. This waveform shows that $V_{VSW}$ is substantially inversely proportional to the operation of switch transistor 24 (i.e, where switch transistor 24 is ON, $V_{VSW}$ waveform is low, and when switch transistor 24 is OFF, the $V_{VSW}$ waveform is high).

Figure 2:
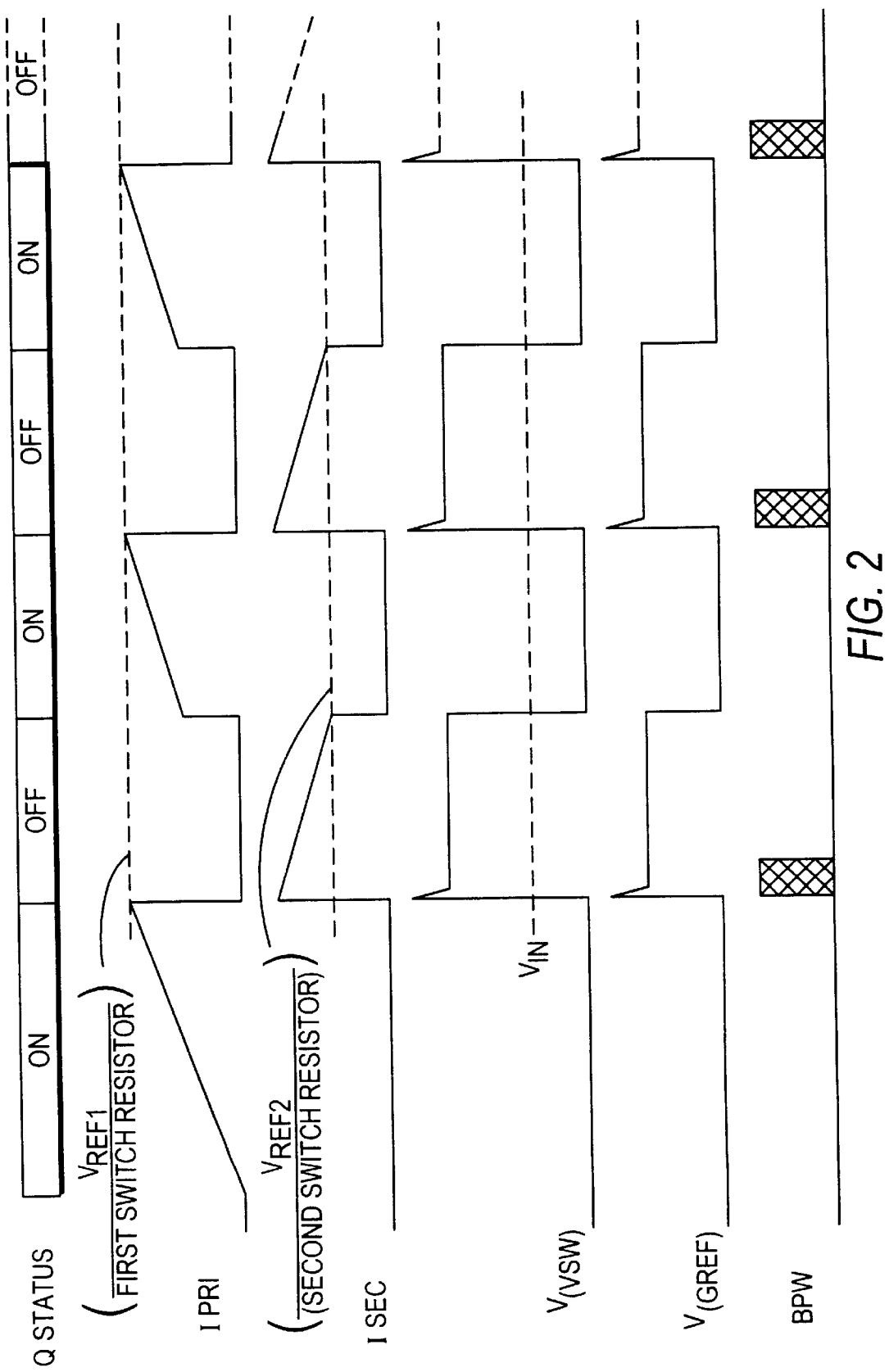
FIG. 2 shows illustrative waveform diagrams of power delivery circuitry and measuring circuitry operation according to the principles of the present invention.

The $V_{VSW}$ waveform is then converted into a normalized, ground-referred waveform illustrated as the $V_{GREF}$ waveform in FIG. 2. This waveform can be produced by first subtracting the voltage provided by power source 70 from the voltage on $V_{VSW}$ node 21 to form a differential voltage across resistor 51. This can be accomplished since the voltage drop across diode 54 and the emitter-to-base voltage of transistor 52 are substantially equivalent. This may maintain the emitter voltage of transistor 54 nearly equal to the voltage provided by power source 70. Second, this differential voltage is normalized by being converted into a current by first resistor 51. Lastly, this current is converted into a ground-referred voltage by second resistor 53. The ground-referred voltage is an instantaneous representation of the output voltage. The ground-referred voltage can be compared to $V_{REF3}$ 55 to determine if the output voltage has reached a targeted value. $V_{GREF}$ can be represented as:

$$V_{GREF}=(V_{OUT}/N)*(R_2/R_1) \quad (9)$$

where $V_{GREF}$ is the ground-referred voltage, $V_{OUT}$ is the output voltage, N is the secondary-to-primary turns ratio, $R_2$ is the resistance value of second resistor 53, and $R_1$ is the resistance value of first resistor 51. Once the target voltage is reached, measuring circuitry 50 can provide a high output signal (i.e., comparator 56 output) to control circuitry 60 (shown in FIG. 5) to indicate that the desired output voltage has been reached.

In some circumstances, it may be necessary to delay the output of measuring circuitry 50. For instance, at the beginning of each OFF-time cycle, a leading edge voltage spike may be produced as the result of leakage inductance in the transformer. Because the voltage spike is not indicative of the actual output voltage, measuring circuitry 50 can include one-shot circuitry 58 to temporarily disable the comparator output signal of comparator 55. One-shot circuitry 58 disables the output signal for a finite period at the beginning of each OFF-time cycle to prevent application of erroneous signals to control circuitry 60.

FIG. 2 also shows the blanking period waveform BPW provided by one-shot circuitry 58. This waveform shows how one-shot circuitry 58 is applied at the beginning of each OFF-time cycle to force comparator 56 to effectively "ignore" the voltage spike caused by leakage inductance.

As described above, power delivery circuitry 20 can be used for setting the ON-time and OFF-time of switch transistor 24 in order to deliver power to output capacitor load 44. As also described above, measuring circuitry 50 can be used to indirectly measure the voltage on the output capacitor load. Control circuitry 60 can be used to activate or deactivate power delivery circuitry 20.

FIG. 5 is a block diagram of one embodiment of control circuitry 60 according to the invention. Control circuitry 60 can include control latch 62, interrogation timer 64, and bias generator 65. Control latch 62 can be a set/reset latch coupled to receive signals from control circuitry 50 and from the output of interrogation timer 64. The measuring circuitry output can be coupled to the reset portion of control latch 62 and the interrogation timer output can be coupled to the set portion of the latch.

The signals received by control latch 62 dictate the output (a high or low output signal) of the control latch. The output of control latch 62 is coupled to interrogation timer 64 and to bias generator 65. Bias generator 65 may be coupled to bias circuitry (not shown to prevent cluttering of the FIGURE) that activates or initiates startup of power delivery circuitry 20 and measuring circuitry 50. As will be explained in more detail, when the control latch output is high, interrogation timer 64 may stop or halt any timing functionality associated with the control circuitry.

The timing functionality or the time limit of interrogation timer 64 may be either fixed or variable.

A variable time limit can provide the capacitor charging circuit with increased flexibility in maintaining the desired output voltage.

The output of control latch 62 is set high during initial capacitor charging circuit startup. The high output from control latch 62 enables bias generator 65 and disables interrogation timer 64. Bias generator 65 can enable or disable power delivery circuitry 20 and measuring circuitry 50. When enabled, power delivery circuitry 20 can charge output capacitor load 44. When the output voltage reaches a desired value, measuring circuitry 50 can output a high signal that resets control latch 62. Once control latch 62 is reset, bias generator 65 is disabled and interrogation timer 64 is enabled (i.e., interrogation timer 64 can start a timer (internal clock) that will eventually reactivate bias generator 65). When bias generator 65 is disabled, power delivery circuitry can no longer charge capacitor load 44.

Once control latch 62 is reset, this may disable power delivery circuitry 20 and measuring circuitry 50. When disabled, power delivery circuitry 20 and measuring circuitry 50 are not provided with power (i.e., because bias generator 65 is disabled). Thus, this may provide the present invention with the ability to conserve power once the desired voltage is obtained. When control latch 62 is reset, power may only be supplied to control latch 62 and interrogation timer 64 when the capacitor charging circuit is disabled. Interrogation timer 64 can keep capacitor power delivery circuitry 20 and measuring circuitry 50 disabled for an adaptable (or pre-determined) length of time. Then, after interrogation timer 64 times out, it can provide a high (done) output signal to set control latch 62. Setting control latch 62 enables bias generator 65 (which enables power delivery circuitry 20 and measuring circuitry 50) and halts interrogation timer 64, thus starting another charging cycle. This charging cycle may run as long as is necessary to raise the output voltage back to the desired value.

The heretofore described system provides the capacitor charging circuit with the ability to maintain the output capacitor load in a constant state of readiness. The level of readiness required dictates the lower level of the range to which the output voltage may fall.

Figure 6:
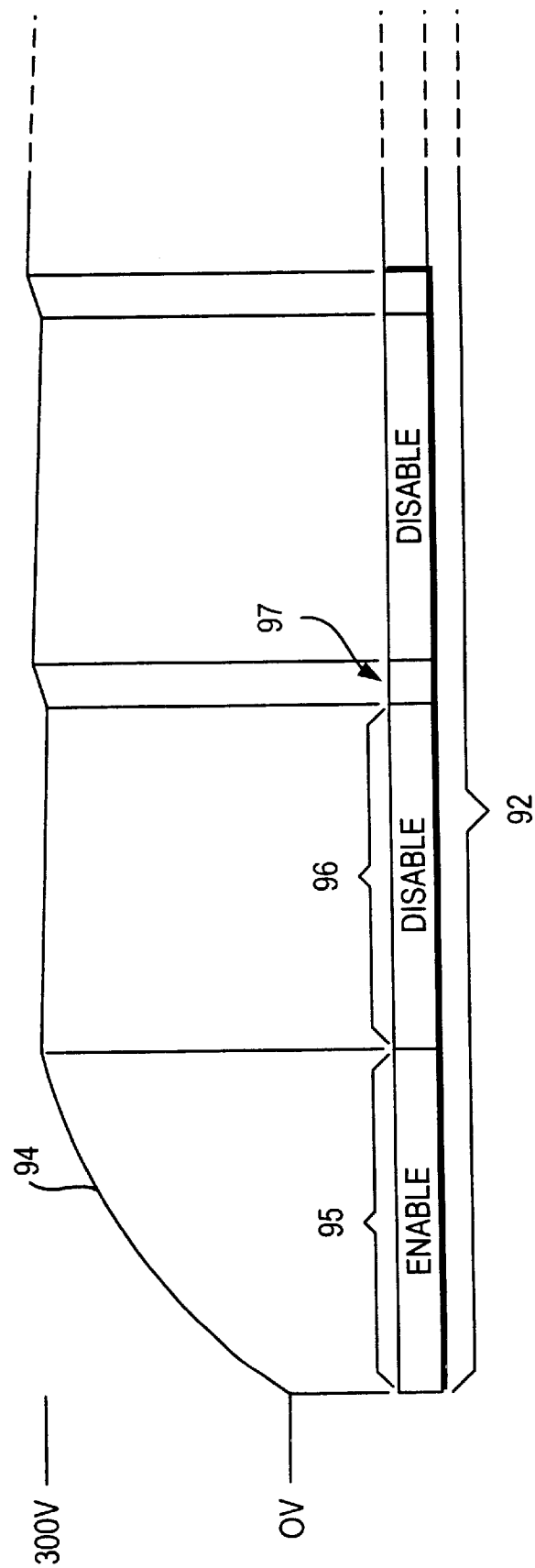
FIG. 6 shows an illustrative waveform diagram of control circuitry operation according to the principles of the present invention.

FIG. 6 shows an illustrative waveform diagram of control circuitry operation according to the principles of the present invention. In particular, FIG. 6 shows the output voltage 94 as a function of control latch status 92.

As stated above, control latch can either disable or enable the charging process. FIG. 6 illustrates an exemplary charging cycle ranging from an output voltage of about zero volts to about 300 volts. When enabled, as shown by trace 95, the capacitor charge circuit charges the capacitive load to obtain the desired output voltage. Once the desired capacitor voltage is obtained, control latch 62 is disabled, as shown in trace 96, until interrogation timer 64 reactivates the latch enable, as shown in trace 97, and also enables power delivery circuitry 20 and measuring circuitry 50. Control latch 20 is enabled (shown as trace 97) for a relatively short period of time in comparison to the control latch 62 enablement of trace 97 because the capacitor load voltage has voltage substantially close to the desired value. Therefore, control latch 62 is not enabled for a substantially long period of time to recharge the capacitive load. Then after the output capacitor load voltage reaches the desired value, control latch 62 is disabled. This cycle, which uses a minimum of power, can be repeated to maintain capacitor load voltage at the desired level.

During capacitor charging circuit operation, the output voltage may rise substantially above the desired level. In such a scenario, the output voltage may be increased to a voltage that prevents the voltage from declining to, or below, the desired level during the disenabled state. If the output voltage does not drop to, or below, the desired voltage during the disenabled state, the capacitor charging circuit may experience voltage runaway. Voltage runaway can occur because the disenabled state may not provide enough time for the output capacitor to drop to, or below, the desired voltage level. Then, over the course of many enablement and disablement cycles (assuming no flash events occur), the voltage will gradually continue to rise. Then eventually, the voltage will reach a critical level that can damage the capacitor charging circuit.

Figure 7:
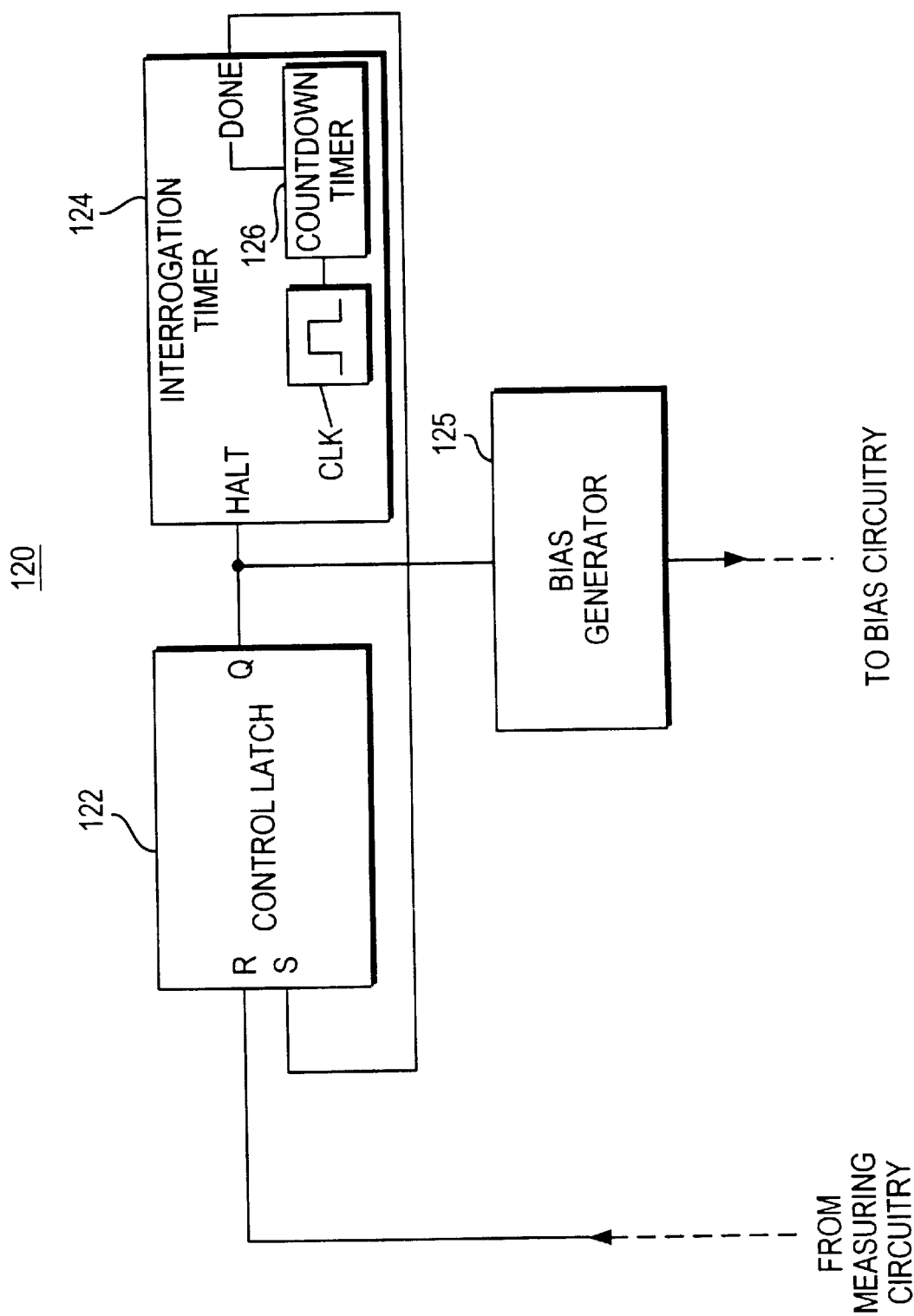
FIG. 7 is a block diagram of an alternative embodiment of control circuitry according to the principles of the present invention.

FIG. 7 is a block diagram of an alternative embodiment of control circuitry 120 suitable for preventing the above described potential output voltage runaway problem according to the present invention. Control circuitry 120 includes control latch 122, interrogation timer 124, bias generator 125. Control latch 122, interrogation timer 124, and bias generator 125 are interconnected and operate in a substantially similar manner as control latch 62, interrogation timer 64, and bias generator 65 of control circuitry 60 as described above.

However, interrogation timer 124 provides additional circuitry that relates to the embodiment shown in FIG. 7. The circuitry is shown to be countdown timer 126, which is coupled to clock CLK. This circuitry can enable interrogation circuitry 124 to be a digitally enabled counter that provides adaptive timing for the disablement state. Countdown timer 126 operates as follows. Countdown timer 126 counts down from an adaptable number of clock cycles set within the timer as will be explained. Once countdown timer 126 counts down from the clock cycles set in the timer, it can cause interrogation timer 124 to time out and provide a high signal on its DONE output.

Interrogation timer 124 provides adaptive timing as follows. Assume, for example, that countdown timer 126 is counting down ten clock cycles. When countdown timer 126 times out, measuring circuitry 50 determines the output voltage. For purposes of this discussion, assume that measuring circuitry 50 determines that the output voltage is above the desired voltage. Such a determination can be provided based on the R input of control latch 122. When R is high (e.g., output voltage at or above desired level), the clock cycles set within countdown timer 126 may be increased incrementally. The increase in clock cycles can be by any suitable increment. In this discussion, assume that the number of clock cycles is increased by ten.

Since the output voltage is above the desired voltage, control latch 122 is reset (i.e., Q goes low). This preferably activates countdown timer 126 in interrogating timer 124. This time, however, countdown timer 126 counts down twenty clock cycles instead of ten clock cycles. Once countdown timer 126 times out, measuring circuitry 50 measures the output voltage. If the output voltage is still above the desired voltage level (e.g., R input remains high), this can result in an additional clock cycle increment. This cycle repeats until the output voltage drops to, or below, the desired level during the disablement state. Hence, control circuitry 60 incrementally increases the set number of clock cycles in countdown timer 126 to adapt the duration of the disablement state.

On the other hand, if measuring circuitry determines that the voltage dropped below the desired voltage, the output of measuring circuitry 50 is initially set low. This low output can change the state of the R input on control latch 122. When R is low (e.g., output voltage is less than the desired voltage level), the clock cycles set within countdown timer 126 decrease. The decrease in the number of clock cycles can be fixed or arbitrary. The decrease can be, for example, greater, lesser, but preferably equal to the corresponding increase of clock cycles. For this example though, the number of clock cycles is reduced by ten. Thus, the clock cycles set in countdown timer 126 may be temporarily set to ten. Once measuring circuitry 50 determines that the output voltage is at or above the desired value, the clock cycles set in countdown timer 126 increase back up to twenty clock cycles. This may occur because the state of R is high.

As a result of countdown timer 126, control circuitry 60 can adapt and obtain the appropriate number of clock cycles for providing the disablement state for the requisite period of time to maintain the desired voltage level without risking voltage runaway.

The capacitor charging circuit of the present invention can be implemented using a variety of different systems. For example, the present invention can be implemented with a micro-processor based photoflash system. The micro-processor can process user input commands such as taking pictures, controlling motor speed for film loading, storing pictures on memory, or any other suitable micro-processor based task. In some cases, the micro-processor can execute a flash event. Other systems can implement simpler mechanisms to execute a flash event. For example, the user may be required to depress a button for a prescribed period of time to initially charge the flash capacitor. Then, to activate the flash, the user simply can press a button to take a picture with a flash.

However, regardless of the system used to operate the flash, the voltage on the capacitor load can drop below the desired operating voltage after the flash event. Therefore, it is desirable to recharge the capacitor load immediately so that the flash can be used again. After the flash event, the system can instruct the control circuitry to activate the power delivery circuitry to recharge capacitor load 44. This instruction can occur when control circuitry 60 is enabled or disabled.

If the capacitor charging circuit is discharged when a flash event occurs, the system can automatically re-initiate the charging process before interrogation timer 64 sets control latch 62. This provides the capacitor charging circuit with the ability to recharge immediately following a flash event. Thus this enables control circuitry 60 to initiate power switching circuitry 20 faster than waiting for interrogation timer 64 to set control latch 62 and begin the recharging process. This can be crucial for rapidly initiating the recharging process because interrogation timer 64 can have a substantially long programable wait time (e.g., ten seconds).

Figure 8:
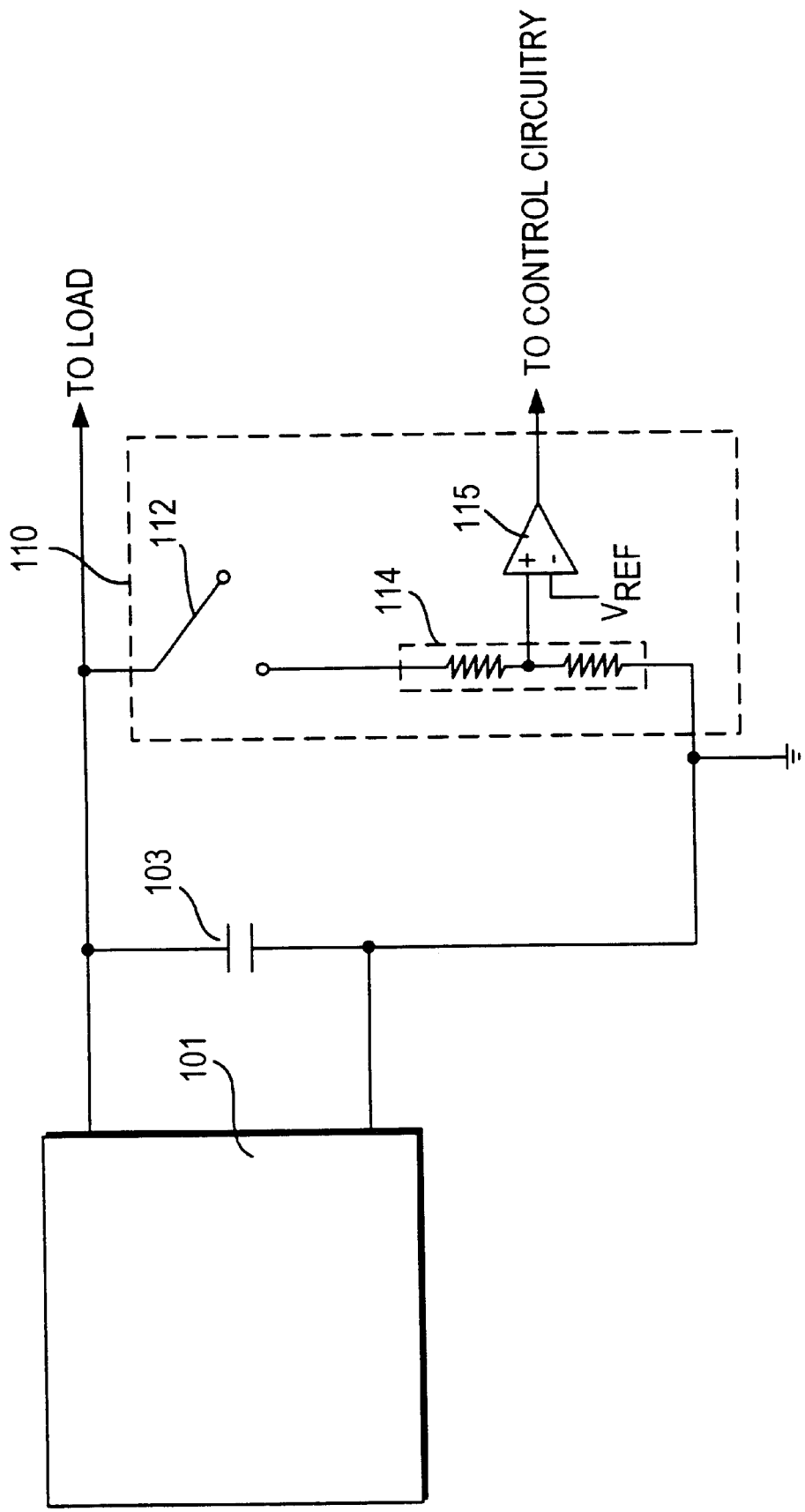
FIG. 8 is a circuit diagram showing an alternative embodiment of measuring circuitry according to the principles of the present invention.

FIG. 8 illustrates an alternative embodiment of measuring circuitry 110 of the present invention. FIG. 8 represents portions of the capacitor charging circuit 101 (e.g., power delivery circuitry and control circuitry), output capacitor 103, and measuring circuitry 110. Measuring circuitry 110 can include switch 112, voltage divider 114, and comparator 115.

Assuming initially, that switch 112 is closed, the circuit of FIG. 8 operates as follows. Circuit 101 provides power to charge the load. Measuring circuitry 110 measures the output voltage when switch 112 is closed. When switch 112 is closed, the output voltage is down-converted by voltage divider 114. The down-converted voltage is then compared to a reference voltage in comparator 115 to determine if the output voltage has reached a pre-determined value. When the output voltage reaches the pre-determined voltage, circuitry 101 may open switch 112 to disable measuring circuitry 110. Measuring circuitry may then be deactivated for a pre-determined period of time until the control circuitry closes switch 112.

In a preferable embodiment, measurement circuitry 110 can be used as follows. In this embodiment, the control circuitry may disable and/or disconnect, but preferably disconnect measurement circuitry 110 when the desired output voltage has been reached. Once the desired voltage is reached, the control circuitry may then reactivate and deactivate measuring circuitry 110 by periodically turning switch 112 ON and OFF. This may provide the capacitor charging circuit with ability to monitor the output voltage while conserving power consumption. This power conservation technique is similar to the charging cycle described in conjunction with FIG. 6.

In another embodiment, measurement circuitry 110 can be used as follows. The control circuitry may selectively operate portions of the capacitor charging circuitry. For example, when the desired output voltage is obtained, the control circuitry may disable the power delivery circuitry. The control circuitry may also disconnect measuring circuitry 110 (by turning switch 112 OFF) for a pre-determined period of time. After the pre-determined period of time elapses, measuring circuitry 110 may be reconnected (by turning switch 112 ON) to measure the output voltage. The control circuitry, however, may not reactivate the power delivery circuitry. If the output voltage is at or above the desired voltage level, the control circuitry may again, disconnect measuring circuitry 110 for a pre-determined period of time. Hence, the capacitor charging circuit of this embodiment can periodically measure the output voltage without activating the power delivery circuitry.

However, if measuring circuitry 110 determines that the output voltage is below the desired voltage level, the control circuitry may enable the power delivery circuitry and connect (e.g., turn switch 112 ON) measuring circuitry 110. This provides the capacitor charging circuit with the ability to charge the output voltage back up to the desired level. Thus, this embodiment provides the capacitor charging circuit with the ability to conserve power while maintaining the desired output voltage.

Thus it is seen that the capacitor charging circuit can efficiently charge a wide range of output capacitor loads and maintain a desired output voltage with minimal power dissipation. Person skilled in the art will appreciate that the present invention can be practiced by other than the described embodiments, which are presented for purposes of illustration rather than of limitation, and the present invention is limited only by the claims which follow.

What is claimed is:

1. A method for charging a capacitor to a pre-determined voltage level, said method using a charging circuit, said method comprising:
    delivering power to said capacitor;
    terminating power delivery to said capacitor when a capacitor voltage level is equal to, or greater than, said pre-determined voltage level; and
    re-starting power delivery after a pre-determined time period.

2. The method of claim 1, further comprising measuring said capacitor voltage level to determine whether said capacitor voltage level is equal to, or greater than, said pre-determined voltage level.

3. The method of claim 1, wherein said terminating comprises enabling interrogation circuitry, wherein said interrogation circuitry re-starts said delivering of power after said pre-determined period of time.

4. The method of claim 1, further comprising cycling through said delivering power, said terminating power delivery, and said re-starting power delivery.

5. The method of claim 1, wherein said delivering power comprises drawing a specified average current level from a power source.

6. The method of claim 5, wherein said specified average current level is maintained at a high average current level by preventing the instantaneous current level from going to a zero current level during delivery of power said capacitor.

7. The method of claim 1, wherein said delivering power to said capacitor comprises:
    providing power to a first winding of a transformer; and
    using a second winding of the transformer to deliver power to said capacitor.

8. The method of claim 7, wherein said first winding is a primary winding, and wherein said second winding is a secondary winding.

9. The method of claim 1, wherein said delivering power to said capacitor further comprises:
    determining an ON-time portion of a power delivery switching cycle;
    determining an OFF-time portion of said power delivery switching cycle; and
    cycling between said ON-time portion and said OFF-time portion to charge said capacitor.

10. The method of claim 9, wherein said delivering power to said capacitor comprises:
    adapting said ON-time portion of said power delivery switching cycle such that a first winding current level increases to a predetermined current level during each ON-time portion of said power delivery switching cycle.

11. The method of claim 9, wherein said delivering power to said capacitor comprises:
    adapting said OFF-time portion of said power delivery switching cycle such that a second current level decreases to a predetermined current level during each OFF-time portion of said power delivery switching cycle.

12. The method of claim 1, further comprising activating said delivering power to said capacitor after a flash event.

13. The method of claim 12, wherein said flash event is the emission of a flash of light.

14. A charging circuit that maintains an output voltage level at or above a predetermined voltage level, said charging circuit comprising:
    power delivery circuitry that delivers power to an output of the charging circuit; and
    control circuitry that disables said power delivery circuitry when said output voltage level is at or above said predetermined voltage level, and after said power delivery circuitry is disabled for a predetermined period of time, said control circuitry re-activates said power delivery circuitry.

15. The charging circuit of claim 14 further comprising measuring circuitry that measures said output voltage level.

16. The charging circuit of claim 14, said control circuitry comprising an interrogation timer that periodically enables said power delivery circuitry.

17. The charging circuit of claim 14, wherein said power delivery circuitry comprises ON-time circuitry that sets an ON-time portion of a switching cycle for delivering power to said output.

18. The charging circuit of claim 17, wherein said ON-time circuitry sets the ON-time portion based on a current through a winding of a transformer.

19. The charging circuit of claim 14, wherein said power delivery circuitry comprises OFF-time circuitry that sets an OFF-time portion of a switching cycle for delivering power to said output.

20. The charging circuit of claim 19, wherein said OFF-time circuitry sets the OFF-time portion based on a current through a winding of a transformer.

21. The charging circuit of claim 14, wherein said output of the charging circuit is coupled to a capacitor.

22. A device that uses the charging circuit of claim 14 to charge and/or maintain said predetermined voltage level on a capacitor that provides sufficient voltage for a flash event.

23. The device of claim 22, wherein the flash event occurs when a light source emits a flash of light.

* * * * *

UNITED STATES PATENT AND TRADEMARK OFFICE
CERTIFICATE OF CORRECTION

| | | |
|---|---|---|
| PATENT NO. | : 6,636,021 B2 | Page 1 of 1 |
| APPLICATION NO. | : 10/324628 | |
| DATED | : October 21, 2003 | |
| INVENTOR(S) | : Jeffrey Schenkel et al. | |

It is certified that error appears in the above-identified patent and that said Letters Patent is hereby corrected as shown below:

On the face of the patent, -- Linear Technology Corporation, Milpitas, CA -- should be inserted as Item [73] (Assignee).

Signed and Sealed this

Nineteenth Day of September, 2006

JON W. DUDAS
*Director of the United States Patent and Trademark Office*

(12) INTER PARTES REEXAMINATION CERTIFICATE (0100th)
United States Patent
Schenkel et al.

(10) Number: US 6,636,021 C1
(45) Certificate Issued: Sep. 8, 2009

(54) CIRCUITS AND TECHNIQUES FOR CAPACITOR CHARGING CIRCUITS

(75) Inventors: Jeffrey Schenkel, Burlington, MA (US); Albert M. Wu, Sunnyvale, CA (US); Robert C. Dobkin, Monte Sereno, CA (US); Steven M. Pietkiewicz, Fremont, CA (US)

(73) Assignee: Linear Technology Corporation, Milpitas, CA (US)

Reexamination Request:
No. 95/000,052, Sep. 23, 2004

Reexamination Certificate for:
Patent No.: 6,636,021
Issued: Oct. 21, 2003
Appl. No.: 10/324,628
Filed: Dec. 18, 2002

Certificate of Correction issued Sep. 19, 2006.

Related U.S. Application Data

(63) Continuation of application No. 09/921,466, filed on Aug. 3, 2001, now Pat. No. 6,518,733.

(51) Int. Cl.
*H02M 3/24* (2006.01)
*H02M 3/335* (2006.01)
*H05B 41/30* (2006.01)

(52) U.S. Cl. .................................. 320/166
(58) Field of Classification Search .............. None
See application file for complete search history.

(56) References Cited

U.S. PATENT DOCUMENTS

| 4,628,229 A | * 12/1986 | Inoue ................. 315/241 P |
| 5,138,543 A | 8/1992 | Harm et al. |
| 6,518,733 B1 | 2/2003 | Schenkel et al. |

FOREIGN PATENT DOCUMENTS

| JP | A-54-144922 | 11/1979 |
| JP | 57-97523 | 6/1982 |
| JP | 61-132937 | 6/1986 |
| JP | HEI-2-99933 | 4/1990 |
| JP | 3-113986 | 11/1991 |
| JP | 5-153775 | 6/1993 |
| JP | A-7-333693 | 12/1995 |
| JP | 11-234919 | 8/1999 |
| JP | 2000-134923 | 5/2000 |
| JP | 2001-128449 | 5/2001 |

* cited by examiner

*Primary Examiner*—Minh T Nguyen

(57) ABSTRACT

The present invention provides a capacitor charging circuit that efficiently charges capacitive loads. In particular, circuits and techniques are preferably provided for using current from both the primary and secondary windings of a transformer to control ON-time and OFF-time of a switch. This arrangement preferably yields an adaptable ON-time and adaptable OFF-time switch that is capable of rapidly charging capacitor loads ranging from as low as zero volts to several hundred volts. The output voltage is preferably measured indirectly to prevent unnecessary power consumption. In addition, control circuitry can be provided to conserve power by ceasing the delivery of power to the capacitor load once the desired output voltage is reached. Control circuitry preferably operates an interrogation timer that perodically activates the power delivery cycle to maintain the capacitor output load in a constant state of readiness.

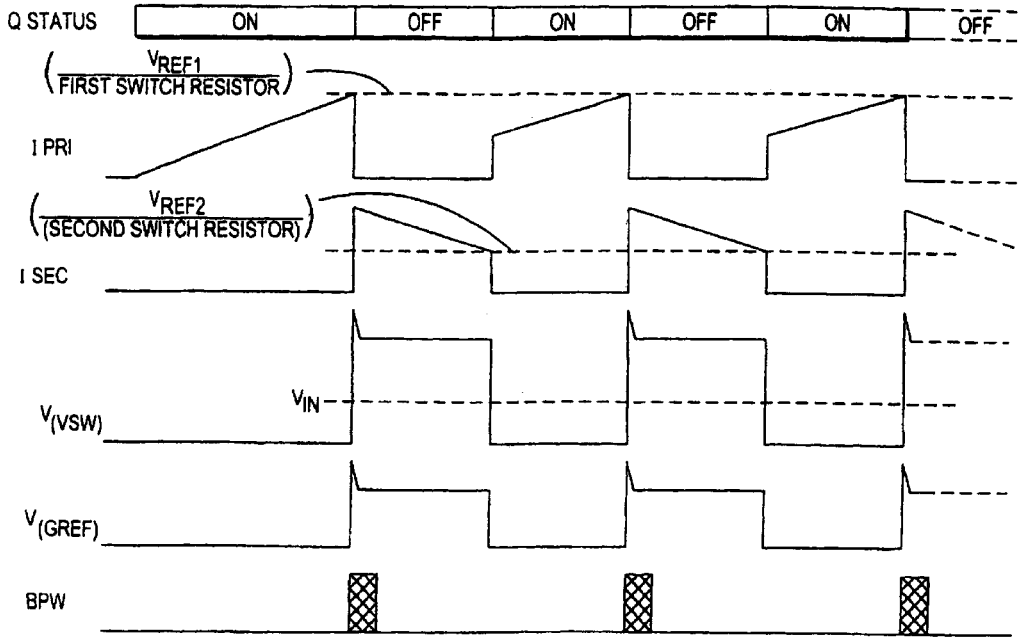

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 15 is cancelled.

Claims 1, 7, 14, 18 and 20 are determined to be patentable as amended.

Claims 2–6, 8–13, 16–17, 19 and 21–23, dependent on an amended claim, are determined to be patentable.

New claims 24–25 are added and determined to be patentable.

1. A method for charging a capacitor to a pre-determined voltage level, said method using a charging circuit *including a transformer to deliver power to the capacitor and measurement circuitry that measures the voltage level of the capacitor*, said method comprising:
   *using said charging circuit,* delivering power to *charge* said capacitor *from a secondary side of the transformer*;
   *measuring capacitor voltage level using the measurement circuitry at a primary side of the transformer;*
   terminating power delivery to said capacitor when [a] capacitor voltage level *measured by the measurement circuitry* is equal to, or greater than, said pre-determined voltage level;
   *reducing power dissipation of the measurement circuitry when the capacitor voltage level is equal to, or greater than, said pre-determined voltage level; and*
   re-starting power delivery after a pre-determined time period.

7. The method of claim 1, wherein said delivering power to said capacitor comprises:
   providing power to a first winding of [a] *the* transformer; and
   using a second winding of the transformer to deliver power to said capacitor.

14. A charging circuit that maintains an output voltage level at or above a predetermined voltage level, said charging circuit comprising:
   *a transformer having a primary side, and a secondary side which is connected to supply power from an output of the charging circuit to charge a capacitor;*
   power delivery circuitry that delivers power to [an] *the* output of the charging circuit *from the secondary side of the transformer*; [and]
   control circuit that disables said power delivery circuitry when said output voltage level is at or above said predetermined voltage level, and after said power delivery circuitry is disabled for a pre-determined period of time, said control circuitry re-activates said power delivery circuitry; *and*
   *measuring circuitry at the primary side of the transformer that provides an indication of the output voltage level only during power delivery.*

18. The charging circuit of claim 17, wherein said ON-time circuitry sets the ON-time portion based on a current through a winding of [a] *the* transformer.

20. The charging circuit of claim 19, wherein said OFF-time circuitry sets the OFF-time portion based on a current through a winding of [a] *the* transformer.

*24. A method as described in claim 1, wherein power delivery is re-started and power dissipation of the measurement circuitry is restored upon expiration of the pre-determined time period.*

*25. A method as described in claim 24, wherein the steps of re-starting power delivery and restoring power dissipation are performed upon expiration of the pre-determined time period automatically.*

\* \* \* \* \*